Feb. 27, 1973   D. R. HULL ET AL   3,718,174
BATTERY ELEMENT CASTING MACHINE
Filed Sept. 15, 1970   7 Sheets-Sheet 1

FIG. 1

INVENTORS
DONALD R. HULL
ROBERT D. SIMONTON
BY
Wilson & Fraser
ATTORNEYS

Feb. 27, 1973   D. R. HULL ET AL   3,718,174
BATTERY ELEMENT CASTING MACHINE
Filed Sept. 15, 1970   7 Sheets-Sheet 2

INVENTORS
DONALD R. HULL
ROBERT D. SIMONTON
BY
Wilson + Fraser
ATTORNEYS

Feb. 27, 1973  D. R. HULL ET AL  3,718,174

BATTERY ELEMENT CASTING MACHINE

Filed Sept. 15, 1970  7 Sheets-Sheet 3

INVENTORS
DONALD R. HULL
ROBERT D. SIMONTON
BY
Wilson & Fraser
ATTORNEYS

Feb. 27, 1973  D. R. HULL ET AL  3,718,174
BATTERY ELEMENT CASTING MACHINE
Filed Sept. 15, 1970  7 Sheets-Sheet 7

FIG. 19

INVENTORS
DONALD R. HULL
ROBERT D. SIMONTON
BY
Wilson & Fraser
ATTORNEYS

United States Patent Office 3,718,174
Patented Feb. 27, 1973

3,718,174
BATTERY ELEMENT CASTING MACHINE
Donald R. Hull, Perrysburg, and Robert D. Simonton, Fremont, Ohio, assignors to Dynalite Corporation, Perrysburg, Ohio
Filed Sept. 15, 1970, Ser. No. 72,442
Int. Cl. B22d 23/04, 39/00
U.S. Cl. 164—154                                26 Claims

ABSTRACT OF THE DISCLOSURE

A machine for casting on connecting straps to the lugs of battery plates incorporating a clamping fixture within a traveling invertible carriage which operates in conjunction with an elevator for raising and lowering the battery plates therein with respect to a casting mold. The mold is of a nature that allows it to be filled with a precise quantity of molten metal by a process of overflowing of the wells to be filled, and subsequently permitting recession of the excess molten metal. A deoxidizing flame is directed upon the surface of the mold and molten metal to condition the metal to receive the lugs and is removed immediately prior to the immersion of the lugs in the molten metal.

BACKGROUND OF THE INVENTION

Originally, battery plates were grouped into cells, corresponding to the cells of the storage battery into which they were to be placed, by connecting them with straps which were affixed to the lugs of the battery plates by a "burning" process. This process was one in which the connecting strap between battery plates was precast and attached to the lugs of the battery plates by melting the lugs while in contact with the strap. Inconsistent results were achieved with the method in that invariably some of the lugs would not achieve proper contact with the strap and no connection would be made. As an improvement to the method, the cast-on method of immersing the battery plate lugs in the molten lead retained by a mold until the lead solidified on the lugs in the form of a connecting strap, was introduced.

Initially the method was abandoned for lack of consistency in obtaining adherence of the steps to the lugs of the battery plates. Subsequent adjustments to the process including temperature control of the molten metal and fluxing of the battery plate lugs made the process a more favorable one.

Machines have been developed to aid the cast-on process by supplying coordinating means between the battery plates and the molds used to assure alignment and proper grouping of the plates, to provide the proper volume of molten metal to the wells of the mold, and for incorporating multiple stations therein to increase production by a multiplicity of simultaneous operations. Two of the most popular methods of supplying the correct volume of lead to a mold are the positive displacement method of a predetermined measured amount from a reservoir, and the metering method which utilizes orifice type pet cock valving and preset time intervals in conjunction with a positive pressure constant head source of supply to the valving to pass the required amount of lead to the mold while the valving is in the open position.

Problems which still plague the art are the lack of consistency in bonding the straps to the lugs of the battery plates, the expense and maintenance of valving or meter equipment which because of its intricacy is not consistent in its performance, and the complexity of operation and especially set-up of the machines in use in the field to date.

The present machine solves these problems with simplified methods of mold filling, making the machine simpler to operate and maintain plus increasing the reliability of the bond of strap to lug by use of a flaming operation on mold and molten metal.

SUMMARY

The present machine relates to casting machines and more particularly to machines for casting on elements to battery plate lugs.

The plates in a battery cell are separated by insulators requiring some means to interconnect the plates of like polarity. Lugs are provided on the top edge and one side only of each plate as viewed in their position within a battery case. The lugs of all negative and positive plates are then respectively aligned on opposite sides of the plates when they are grouped into cell arrangements.

The present machine interconnects the lugs on each side of a group of plates by casting on a lead strap which adheres to each lug on its respective side of the battery. A machine of this nature consists of a base or an outer frame on which is mounted a mold having cavities and wells as well as provisions for continuous supply and periodic interruption of return flow of molten metal. The mold is constructed for overflowing the cavities of the mold, i.e. overflow filling, by building up molten metal within a canal having supply and return points, upon interruption of the return flow of molten metal. The source of molten metal is independent of the machine and can be from any convenient source with means for supplying the lead to the supply well of the mold. The continuous flow of metal to the supply well and across the canal to the return well maintains the mold canal and adjacent wells at a temperature sufficient to maintain flow of metal absent any other heat source, even when the mold cavities are being cooled. Another source of heat is furnished for impingement on the surfaces of mold and molten metal to bring these surfaces to temperature for free flow of lead in addition to deoxidizing the surface of the lead. Also connected to the outer frame is an elevator for raising and lowering the battery plates, with lugs pointed down, from and to the mold as well as maintaining the position of the lugs within the cavities of the mold. A knockout table supporting knockout pins is also attached to the outer frame with the knockout pins having access through adaptors to recesses in the bottom of the mold cavities to release the solidified metal from the cavities by pushing upward against the metal in transversing the adaptors. In the retracted position the knockout pins become the bottom of the recess preventing flow of metal from these recesses.

Complementary equipment on the machine includes cooling tubes for the mold adaptors and cavities, a clamping fixture adapted to the elevator for positioning battery plates by gripping groups of plates in spaced arrangement correlating to the spacing of mold cavities and battery cells, a horizontally transversing carriage which carries the clamping fixture and rides within grooves in movable rails on the elevator, while at the same time being adaptable to matching rotatable rails pivotally mounted on the outer frame of the machine, and a crank wheel to impart a half revolution to the rotatable rails thereby inverting the carriage, clamping fixture and battery plates held therein.

The present machine overcomes the need to accurately measure off the exact amount of molten metal required to fill a given mold cavity prior to filling the mold and replaces this process and all the equipment required for measuring and metering with a simple process of overflow filling which is much easier to control and more economical from an equipment, operating and set up standpoint.

Another advantage of the present machine is the incorporation of the deoxidizing and heating flame on the mold and molten metal to aid the adherence of molten metal, and subsequently the resulting casting, to the lugs of battery plates.

Further objectives of the machine are to provide an integrated machine through use of the complementary equipment resulting in a machine capable of receiving groups of loose battery plates, and after one cycle of the machine, depositing the plates in proper order in a battery case with the plates interconnected on a cell by cell basis.

The resulting machine is one so simple in its mode of operation as to inevitably result in less maintenance, and therefore lower overall cost in the machine. The simplicity of operation makes the machine favorable from the standpoint of requiring less skills in the attendant while increasing production over the old "burning" process.

DESCRIPTION OF THE PREFERRED EMBODIMENT

Figure 1:
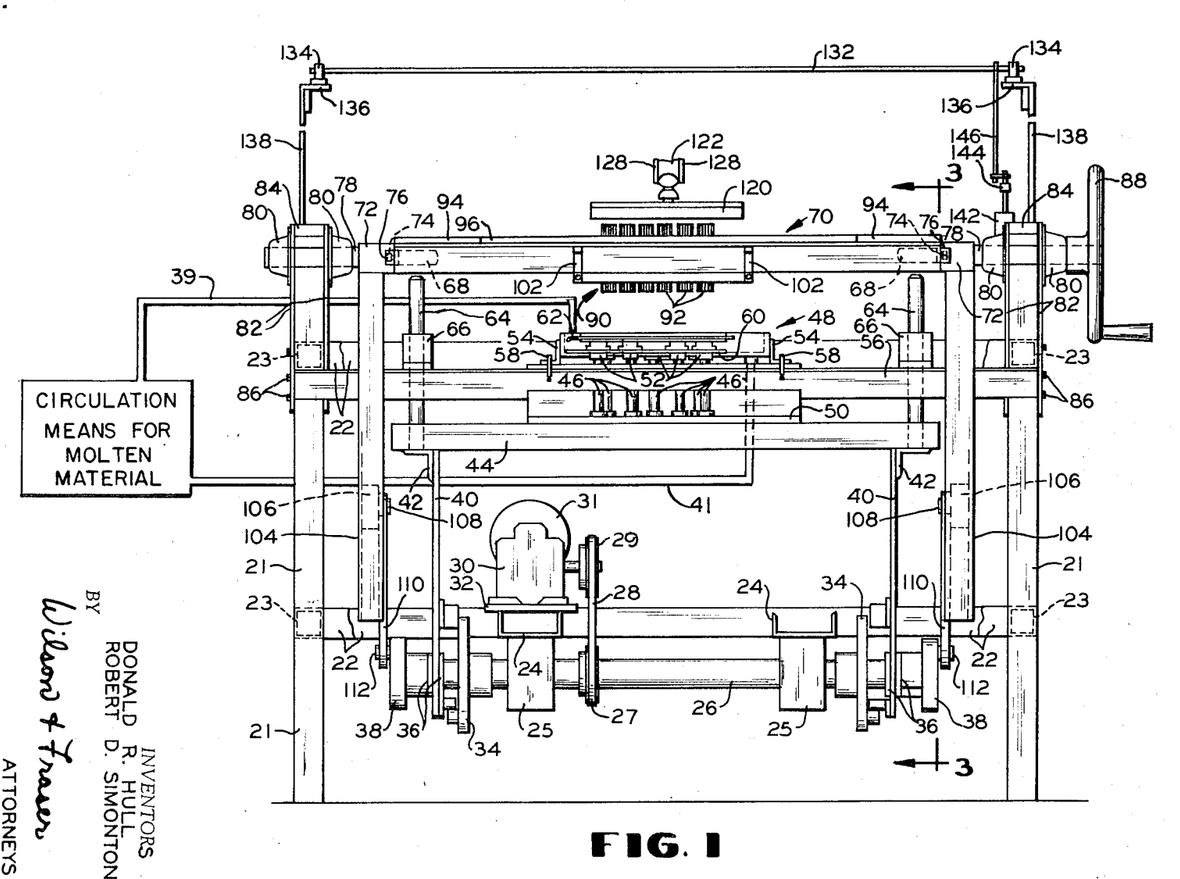
FIG. 1 is a front elevational view of the machine with the front cross ties cut away to illustrate greater details of the machine and with equipment for supplying molten material illustrated schematically.
Figure 2:
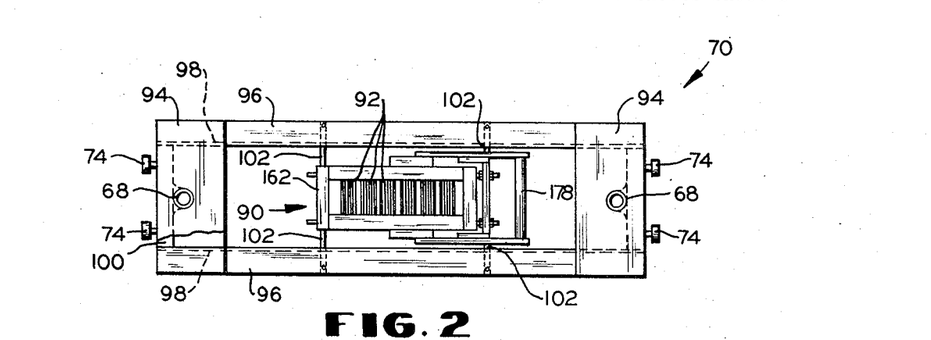
FIG. 2 is a plan view of the machine carriage with the clamping fixture mounted within the carriage.

FIGS. 1 and 2 illustrate the overall arrangement of parts of the present machine within which interleaved battery plates 92 and separators are placed with the lugs of the battery plates facing downward in the operative position A. The battery plates 92 are held by a clamping fixture 90 mounted in a carriage 70. The carriage 70 is on movable rails 114 in position A which rails 114 are attached to an elevator for transferring the battery plates 92 to and from the mold 48. When the plates 92 are lowered by the elevator, the lugs are positioned within the mold 48 so as to contact molten metal within cavities in the mold 48. The molten metal is supplied by any conventional means such as the reservoir 33 heated by heater 35 and is circulated by pump 37 through supply conduit 39 and return conduit 41 illustrated schematically in FIG. 1. The molten metal is fed to mold 48 through conduit 39 from a molten material circulating means and returned from the mold 48 to that circulating means by conduit 41. Upon solidification of the molten metal within the cavities of the mold 48 and adherence to the lugs, both the elevator and knockout table supporting knockout pins 46 are activated. The pins 46 push the casting, in the form of a strap connecting plates 92 of a battery cell, having like polarity out of the mold while the elevator simultaneously lifts the plates 92. Returning to position A the carriage 70 can be transferred to position B by virtue of the alignment of the movable rails 114 with the rotatable rails 72. The rotatable rails 72 can then be pivoted a half revolution to invert the carriage to position C where the plates 92 are released from the clamping fixture 90 to fall properly indexed, with strap connectors attached, into an awaiting battery case 158. Upon being returned to position B, the carriage 70 and clamping fixture are ready to again be loaded with plates 92 while the burner assembly can now be swung over position A to sweep a flame over the mold 48 and the molten metal therein.

Referring to FIGS. 1 through 18, FIG. 1 is an elevation of the machine viewed from the front end in which position the attendant of the machine, if present, would view the machine. The base or outer frame of the machine, which furnishes the structural support for the mechanical operative elements of the machine, is a steel frame of welded construction. The frame consists of four vertical legs 21, four cross ties 22 and four end ties 23. The two cross ties 22 in front of the machine have been broken away to illustrate further detail. Together the pieces form a box frame with the vertical legs 21 being floor mounted. Two inverted channels 24 transverse between the bottom cross ties 22 with the ends of the channels 24 being welded to the cross ties 22. One bearing 25 depends from each channel 24. The bearings 25 are aligned to allow passage of a drive shaft 26 through the center thereof, thereby supporting the shaft and tieing it structurally to the outer frame. A driven sprocket 27 is mounted on and keyed into the shaft 26 being located between the two bearings 25. The driven sprocket 27 is connected by chain 28 to the drive sprocket 29 mounted on the output shaft of a right angle gear reducer 30 driven by an electric motor 31. The motor 31 and reducer 30 are mounted on the left channel 24 which has a cover plate 32 to which the motor 31 and reducer 30 are bolted. At each end of the shaft 26 there is mounted a dual action cam actuator 34, two restraining collars 36 and a crank type eccentric 38. The cam actuator 34 will be described in more detail below in conjunction with the operation of the knockout table, as will the operation of the elevator driven by the eccentric 38. The restraining collars 36 straddle reciprocating supports 40. These supports along with angles 42 and the inverted channel 44 form the knockout table.

The knockout table supports knockout pins 46, the upper ends of which reside in the lower mold recesses on both sides of the mold 48. The pins 46 are properly spaced at the knockout table end by plate 50 and are guided into the mold 48 by adaptors 52. The plate 50 forms a base for all the knockout pins 46 making an integral unit of pins 46 and plate which mates with the mold 48 and adaptors 52. The unit structure makes the pins 46 readily interchangeable with respect to the knockout table, when called for by a change in mold 48 configuration. Two angles 54 are welded to the mold 48 and supported by transverse angles 56 running parallel to and on both sides of mold 48. Clamps 58 on all the four corners, where angles 54 cross over the top of angles 56, hold the mold 48 securely in place while maintaining the mold 48 in a manner which makes it readily removable. The top flanges of angles 56 are then affixed to the outer frame of the machine by welding the flanges of angles 56 to the upper end ties 23 where the flanges cross underneath the end tie 23. This results in the mold 48 being affixed to and supported by the outer frame of the machine. Fragments of water cooling tubes 60 and 62 are illustrated attached to the pin adaptors 52 and mold 48 respectively. These tubes appear on the back as well as the front of the machine.

Alignment of the knockout table with the mold 48 is essential if the pins 46 are to be free to move within the mold adaptors 52. Guide pins 64 align the knockout table with the mold 48. The guide pins 64 are affixed to the knockout table at their base and extend up through sleeves 66 attached to the mold support angle 56 having a sliding fit with the sleeves 66. The sliding fit allows movement of the knockout table while at all times maintaining contact between guide pin 64 and sleeve 66 to achieve the desired alignment. One guide pin 64 is attached to each side of the knockout table.

The guide pins 64 are tapered at the top and extend upward beyond the sleeve 66 to engage bushings 68 in the carriage 70. The sliding fit between guide pins 64 and bushings 68 maintains alignment between carriage 70 and mold 48, in a manner duplicating that of the knockout table, even while the carriage 70 is being raised and lowered. The travel of the carriage 70 extends beyond that of the guide pins to allow horizontal indexing of the carriage 70 as well as inverting of the carriage 70 when positioned within the rotatable rail 72. Positioning of the carriage 70 is facilitated by four wheels 74, two on each side of the carriage 70, which are journaled in a cantilever manner to the carriage 70 and ride in rail grooves 76. The rotatable rail pivots on two stub shafts 78 each mounted in a pair of flange bearings 80. Two plates 82, connected at the top by a third plate 84 welded inbetween them, support a pair of flange bearings 80 on each side of the machine. The plates 82 are attached to the outer frame by bolts 86 which pass through both the upper end ties 23 and the front legs 21. The stub shafts 78 are cantilever connected to the rotatable rail 72 and affixedly fastened. The right side stub shaft 78 is slightly longer than the left side stub shaft 78 to accommodate a crank wheel 88 on the end of the shaft 78 opposite that connected to the rotatable rail 72.

The carriage 70 supports and positions the plate clamping fixture 90 which in turn supports, positions, and properly spaces the battery plates 92 in groups correlating to the cells of a battery. FIG. 2 is a plan view of the carriage 70 with clamping fixture 90 attached. The clamping fixture 90 is illustrated with the battery plates 92 positioned in the clamped position. End cover plates 94 are butted against cover plates 96 and welded together to form a frame for the carriage 70. Further, rigidity is provided by angles 98 passing underneath both cover plates 94 and 96 and welded to them. Angles 98 are then connected at their ends by end plates 100 welded between them and to the bottom of the end cover plate 94. The end cover plate 94 on the left side of FIG. 2 is broken away to reveal angle 98 and end plate 100. End plates 100 are mounted with their major faces oriented to face outward from the end of the frame of the carriage 70 to facilitate the mounting of the carriage wheels 74 on the end plates 100. The end plates 100 also lend support to the bushings 68 which are mounted in the end cover plates 94 and extend downward below the cover plates 94. The extended portion is welded to the end plate 100. The clamping fixture 90 is attached to the frame of the carriage 70 by four connecting bars 102 which are bolted to the fixture 90 and then in turn to the frame of the carriage 70 particularly to angles 98 and cover plates 96.

Figure 3:
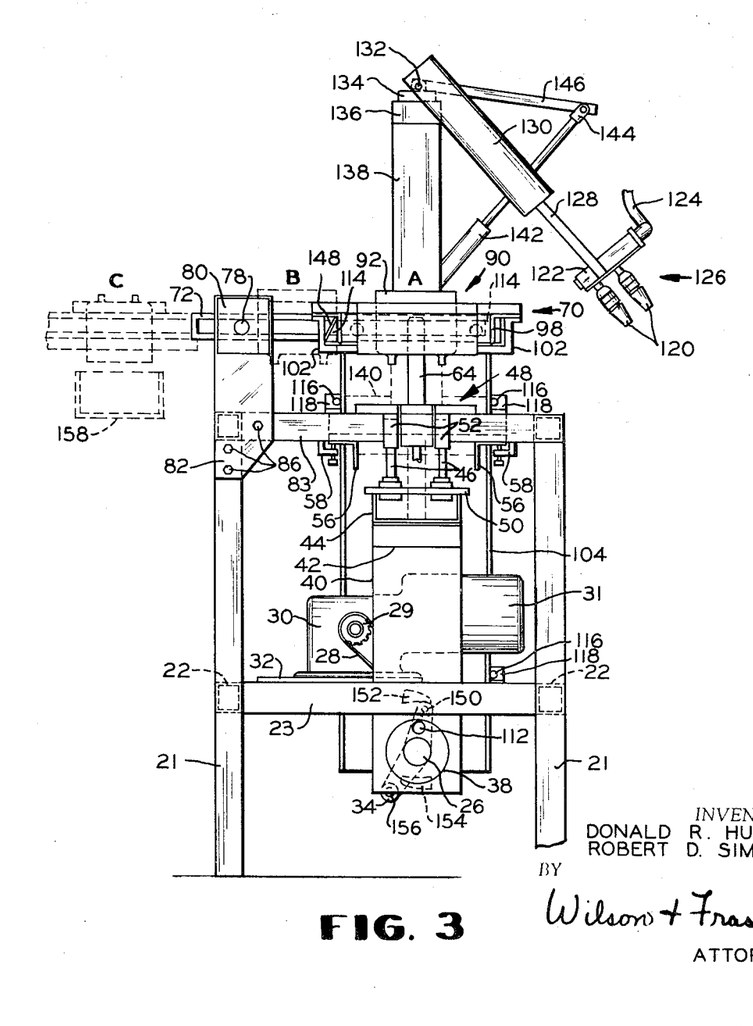
FIG. 3 is an end view of the machine in FIG. 1 taken along line 3—3.

Returning to FIG. 1, the channels 104, journal blocks 106, pivot pins 108 and bar link 110, forming a connecting link from the eccentrics 38 and their pivot pins 112, constitute the mechanics of an elevator when viewed in conjunction with movable rail 114 which is best illustrated in FIG. 3. The movable rail 114 is rigidly affixed to the top of the channel 104 which channel 104 is guided by four guide rolls 116 journaled in a cantilever connection to blocks 118 attached to end ties 23. Three of the four guides are apparent in FIG. 3 which illustrates one of the two channels 104 on each side of the machine. FIG. 3 and FIG. 1 further illustrate a pair of premix burners 120 piped to a manifold 122 to which a flexible supply hose 124 (a fragment of which is illustrated) is connected. The hose 124 allows the burner assembly 126 to be swung into place over the mold 48 and subsequently removed when the carriage 70 is to be positioned over the mold 48. The burner assembly 126 is supported by brackets 128 and 130 which in turn are affixed to shaft 132. Shaft 132 is pivotally mounted in pillow block bearings 134 mounted on angles 136 which are supported by plates 138 whose bases are affixed to the outer frame of the machine by an angle 140 welded to the plates 138 and upper end ties 23. The swinging motion of the burner assembly is actuated by a cylinder operator 142 pivotally connected at both the base and rod ends of the cylinder 142 to clevises 144 mounted on the outer frame and actuating bar 146 respectively. With the actuating bar 146 rigidly affixed to the shaft 132 supporting the burner assembly brackets 128 and 130, movement of the cylinder rod attached to the actuating bar 144 causes rotation of the shaft 132 thereby swinging the burner assembly.

Just as the alignment of knockout table to carriage 70 was assured by the introduction of the alignment pins 64, so to the synchronization of elevator movement with movement of the knockout table is assured by direct coupling of the knockout table cam actuators 34 with the elevator eccentrics 38 by virtue of common connecting means in the drive shaft 26. The elevator is moved vertically from its top position to bottom position by a full revolution of the eccentrics 38 on each side of the machine. The rotational motion of the eccentrics 38 is converted to linear motion of the channels 104 by the reciprocating bar links 110. The rail split 148 which separates the rotatable rail 72 segments from the movable rail 114 segments enables the movable rails 114 to move with the channels 104. The vertical movement is imparted to the carriage when it is positioned between the movable rails 114. With the plate clamping fixture 90 positioned in the carriage 70 and battery plates 92 clamped in the fixture 90 with the lugs of the battery plates 92 facing downward, the elevator can lower the lugs of the battery plates 92 into the mold 48 from the top position of the elevator shown in FIG. 3. In the down position (a half revolution of the eccentrics 38) the elevator can be stopped to facilitate the cast-on operation wherein molten lead in the mold 48 which now surrounds the lugs is allowed to solidify on the immersed lugs of the battery plates 92 forming castings of straps thereon.

At this point in the operation, it is very important to release the castings from the mold 48 before raising the elevator to prevent the lugs on the battery plates 92 from being pulled off of the castings in the event that the castings are retained by the mold 48. In the same sense, it is equally undesirable to release the castings prematurely, i.e., with the elevator stationary, resulting in the castings, which can only be released in an upward direction, being jammed against the battery plates 92. The machine is designed to overcome this problem by simultaneous motion of the knockout table, and the pins attached thereto, with the raising of the elevator. This motion is accomplished by the direct coupling of the knockout table cam actuators 34 with the elevator eccentrics. FIG. 3 illustrates the relationship between these two mechanisms. With the elevator in the up position, the eccentric pivot pin 112 is at the top of its circle of motion. Just slightly out of phase with the eccentric pivot pin 112 is the cam actuator raising pin 150 which in the upper position illustrated can be seen to pass underneath the lowering cam 152 without contacting it. When the drive shaft 26 is subsequently rotated a half revolution, the pivot pin 112 reaches its down position, which is diametrically opposite the position illustrated, and the raising pin 150 is in a position pending contact with the raising cam 154.

As further rotation occurs, the pivot pin 112 starts its upward motion, thereby raising the elevator, and at the same time, the raising pin 150 engages and subsequently passes over the bottom cammed surface of the raising cam 154. The motion in the upward direction imparted to the raising cam 154 duplicates that imparted to the elevator by the pivot pin 112 because the raising cam 154 has the cammed surface contoured with the radius swung by the pivot pin 112. Since the raising cam 154 is fixedly attached to the reciprocating support 40 of the knockout table on both sides of the machine, the knockout table and knockout pins 46 attached thereto are caused to move vertically at the same rate and time as the elevator. The result is that the knockout pins 46 push the castings up out of the mold at the same time that the elevator raises the battery plates 92, the lugs of which are now attached to the castings. The upward motion of the raising cam is of short duration resulting in a short abrupt movement and travel of the knockout pins 46 lasting only while the raising pin is in contact with the raising cam 154. The abrupt motion virtually punches the casting from the mold. The reciprocating supports 40 are slotted around the drive shaft 26 to allow movement while being guided by collars 36 on each side of the support 40.

Once the castings have been released from the mold 48 it is desirable to return the knockout pins 46 to their original or recessed positions. This is accomplished by the cam actuator mounted lowering pin 156. Up to this point the lowering pin 156 has been inactive passing under the raising cam 156 without contacting it. But now as the raising pin 150 disengages the raising cam 154, the lowering pin 156 position is shaped with respect to the raising pin 150 to contact the lowering cam 152 having a cam surface contour inverse of that of the raising cam 154 which returns the knockout pins 46 to the recessed position. This lowering motion is also of a short duration similar to that of the raising cam 154 leaving the knockout table inactive over the major portion of the upward and downward motion of the elevator.

The above motions can thus be accomplished with one drive source on the drive shaft 26, in this case the source being the electric motor 31 and reducer 30 coupled to the shaft 26 by chain 28 and sprockets 27 and 29. Control of the motion can be manual, by use of push buttons, or automated using timers and limit switches.

To facilitate loading and unloading of battery plates, the carriage 70 in conjunction with the rotatable and movable rails 72 and 114 is positionable as shown in FIG. 3 by phantom positions B and C in addition to the operable position A illustrated. In the operable position A illustrated, the carriage is manually pushed to the back, or right, of the movable rails 14 where typically limit switches at the ends of the rails 114 are closed before the elevator can be energized. With the elevator in its top position, FIG. 1 illustrates that the guide pins are sufficiently below the carriage 70 to allow horizontal movement by the carriage 70. Contact of the limit switches (not illustrated) assure sufficient alignment of the carriage to enable the guide pins 64 to engage the carriage bushing 68 on the downstroke. In this manner, when the battery plates 92 and clamping fixture 90 are properly positioned in the carriage 70, alignment of battery plates 92 to mold 48 is also assured. The carriage is easily moved being supported by wheels 74 traveling in a groove 76 in the rails 72 and 114. When the rotatable and movable rails 72 and 114 are aligned in the same horizontal plane with each other the carriage can be transferred manually to the position indicated by B. This transfer accomplishes two objectives: (1) the area directly above the mold 48 is cleared which allows the mold to be serviced, removed, inspected etc. and the burner assembly 126 to be swung in place over the mold; and (2) the operator has easy access for loading the battery plates 92 into the carriage which is now directly in front of him. Further, for the unload phase of the operation, position B provides the proper orientation of the battery plates 92 for inversion into an awaiting battery case 158 at position C. Transfer to position C is accomplished by rotating battery plates 92 a half revolution about the stub shaft 78 by turning the crank wheel 88 illustrated in FIG. 1 which is keyed to stub shaft 78 which in turn is affixed to the rotatable rail 72 resulting in rail 72 and carriage 70 therein being inverted. The battery plates 92 at this point in the operation are interconnected by the cast-on straps on a cell basis and in addition are still firmly held in the cell grouping by the clamping fixture 90. The cell grouping of the battery plates 92 duplicate the spacing of the battery case 158 so that when the battery case 158 is aligned under the inverted battery plates 92 as illustrated by position C, the battery plates 92 can be dropped exactly in place within the battery case 158. To allow the battery plates 92 to fall into the battery case 158, the operator must release the clamping fixture 90 which holds the plates in suspension.

Figure 4:
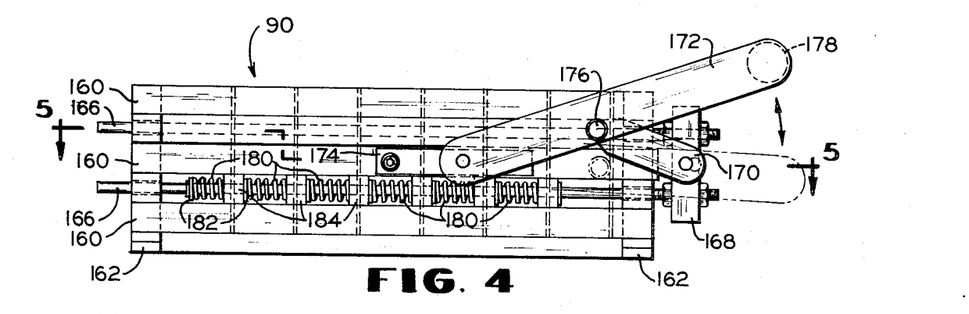
FIG. 4 is an elevational view of the clamping fixture.
Figure 5:
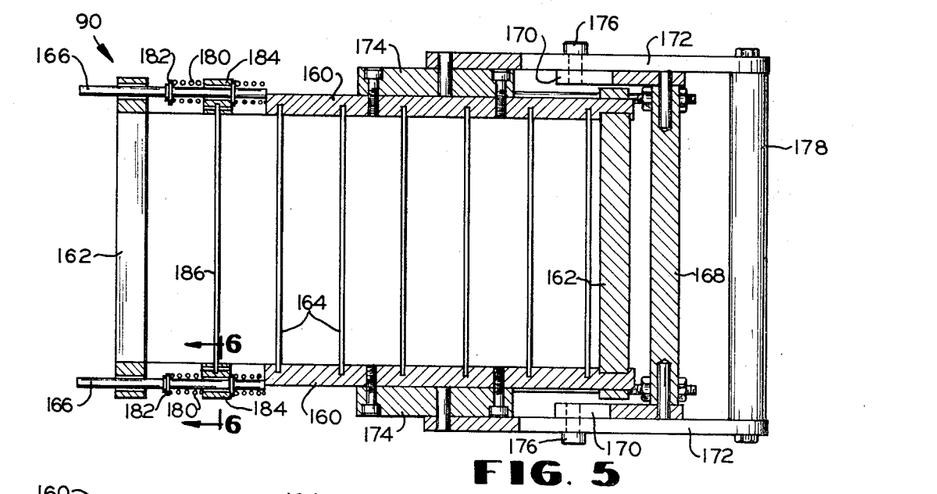
FIG. 5 is a sectional view of the clamping fixture in FIG. 4 taken along line 5—5.
Figure 6:
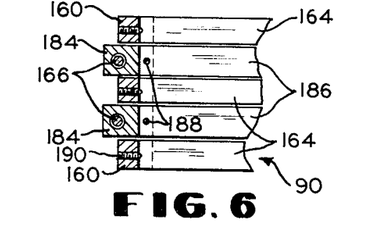
FIG. 6 is a fragmentary sectional view of the clamping fixture in FIG. 5 taken along line 6—6.

A typical clamping fixture 90 is illustrated in FIGS. 4, 5 and 6. Six longitudinal bars 160, three on each side are affixed to end plates 162 at the ends thereof to form a rectangular frame which supports stationary clamp bars 164 as well as the travel rods 166. The travel rods 166 are oriented parallel to the longitudinal bars 160 passing through holes in the end plates 162. One travel rod 166 is spaced essentially between each of the longitudinal bars 160, for a total of four travel rods 166. The travel rods are connected by a connecting plate 168 to which one end of each traveling rod is bolted after its threaded end is passed through the connecting plate 168. A pair of toggles consisting of bar links 170 and 172 are pivotally connected to the connecting plate 168 and the middle longitudinal bar 160 respectively on each side of the fixture 90. Space bars 174 are inserted between the middle longitudinal bars 160 and bar links 172 to properly position the bar links 172 with respect to bar link 170. The bar links 170 and 172 are joined at their intersection by an adjustable pin connection having three position settings in the bar link 172 for the toggle pin 176. The two toggles are joined into one mechanism by the handle 178.

Movement of the handle 178 downward from the up or open position illustrated in FIG. 4, causes the connecting plate 168 to move out away from the end plate 162 adjacent to it as the bar links move into a horizontal position locking the toggles. In the locked position, the toggles can only be released by raising the handle 178 and not by by any other forces on the mechanism. The travel rods 166 move with the connecting plate 168 causing compression of the springs 180 which are located on the travel rods 166, by the rod collars 182 moving against the movable clamp bar mount 184. The bar mounts 184 slide on the travel rods 166 with the tendency to slide resisted by the force of the springs 180. Thus the bar mounts move with the travel rods 166 until contact is made by the movable calmps bars 186 against battery plates 92 inserted between the movable and stationary clamp bars 186 and 164. FIG. 5 illustrates the movable clamp bar 186 mounted in the bar mounts 184 and secured by a fastening pin 188 in a manner typical for all the movable clamp bars 186. This connnection makes the movable clamp bars 186 and the pair of bar mounts 184 attached thereto, an integral unit. The unit moves with the travel rods on which the bar mounts 184 ride until contact is made with the batter plates 92, as illustrated in phantom, at which point the bar mounts are stopped and the continued travel of the travel rods 166 causes the rod collar 182 to the left of the bar mount 185 to compress the spring 180 against the bar mount 184. Compressing the spring 180 and subsequently locking it in position with the toggles results in the movable clamp bar being held snugly against the stationary clamp bars 164 thereby securing the battery plates 92 in position. With the stationary clamp bars 164 spaced in a manner correlating with that of the cells of a battery, it becomes apparent that the fixture 90 illustrated in FIG. 5 can maintain the position of a series of battery plates 92 and their required insulating spacers between each battery plate 92 in six groups corresponding to the spacing of cells in a six cell battery. While a six cell arrangement is illustrated, clearly, the concept can be expanded to twelve cells or any other number of useful cells.

The configuration of the spaced stacks of movable and stationary clamp bars 186 and 164 is best illustrated by FIG. 5 which depicts the bars 186 and 164 spaced inbetween each other in a common plane which is vertical, in the open position of the fixture 90. It becomes obvious that the clamping action is between the movable clamp bars 186 and the stationary clamp bars 164 directly in front of the movable clamp bars 186 which are not illustrated, but have the same spacing orientation as the stationary clamp bars 164 illustrated. Also illustrated are the set screws 190 used to retain the stationary clamp bars.

Figure 7:
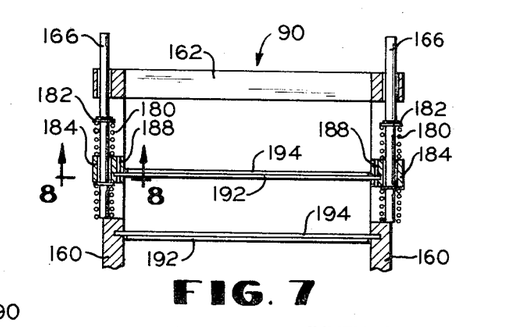
FIG. 7 is a fragmentary sectional view being a variation of the view illustrated in FIG. 5.
Figure 8:
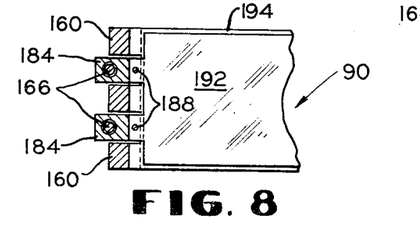
FIG. 8 is a fragmentary sectional view being a variation of the view illustrated in FIG. 6.

FIGS. 7 and 8 illustrate a variation of the clamping fixture where movable clamp plates 192 replace the movable clamp bars 186 and stationary clamp plates 194 replace the stationary clamp bars 164. In this alternative, the plates 192 and 194 are faced against each other rather than interlaced in a common plane as were the bars 164 and 186.

Other variations are possible such as replacing the springs or toggles with similar mechanical mechanisms as well as substitution of similar structural elements for the plates, bars or rods used. Such variations should not limit the scope of the fixture 90. Further, the clamping fixture 90 is an integral unit which is readily removed and inserted into the carriage 70 to accommodate mold 48 changes which require different style fixtures 90. For example, a fixture 90 for a single cell industrial battery would not have the cell divisions defined by the bars and plates of the above fixtures 90.

Figure 9:
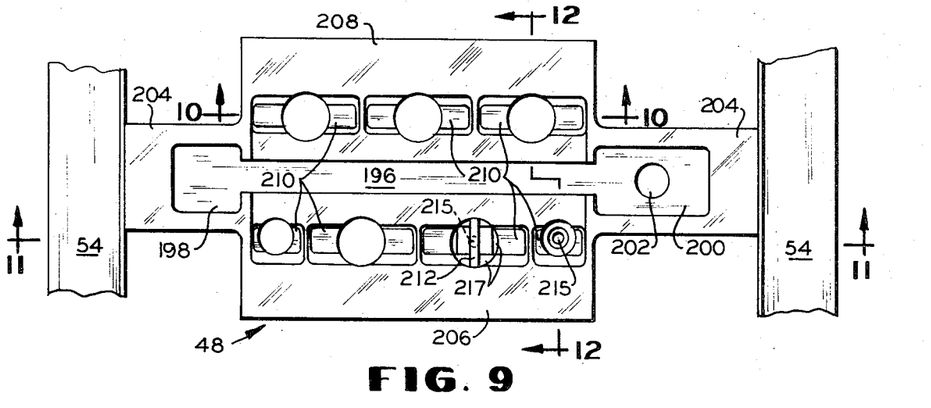
FIG. 9 is a plan view of a mold with fragments of supporting angles attached.
Figure 10:
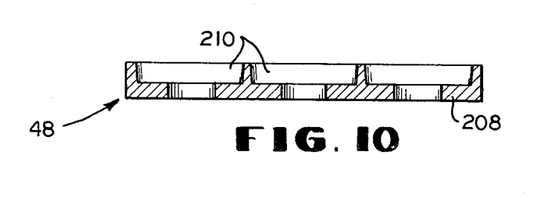
FIG. 10 is a sectional view of the mold in FIG. 9 taken along line 10—10.
Figure 11:
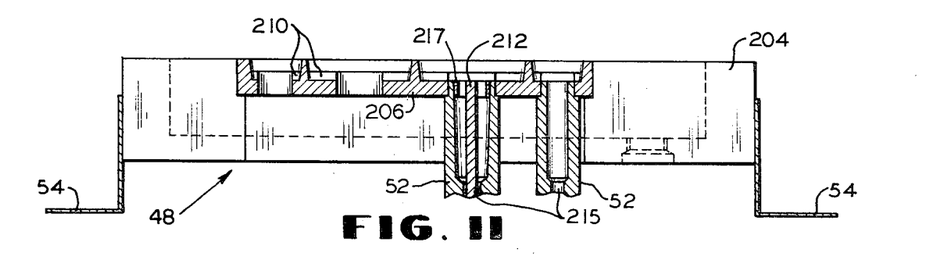
FIG. 11 is a sectional view of the mold in FIG. 9 taken along line 11—11.
Figure 12:
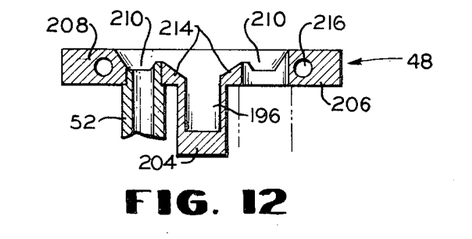
FIG. 12 is a sectional view of the mold in FIG. 9 taken along line 12—12.
Figure 13:
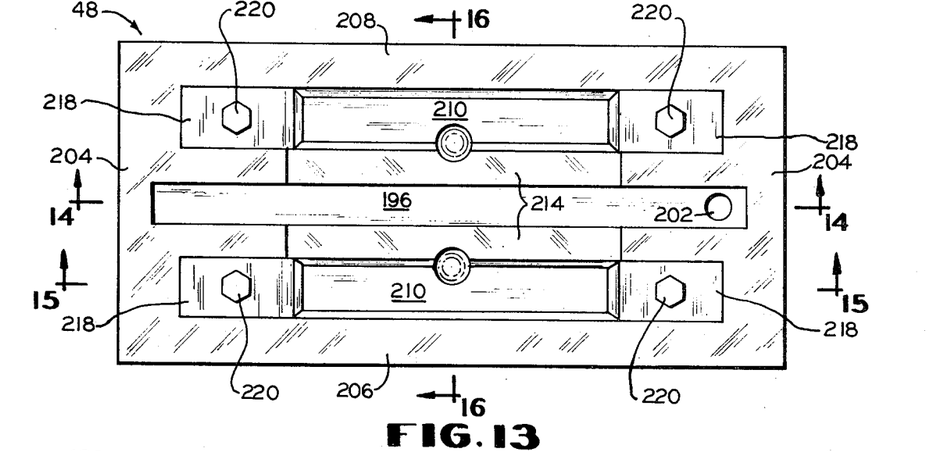
FIG. 13 is a plan view of a mold being a variation of the mold illustrated in FIG. 9.
Figure 14:
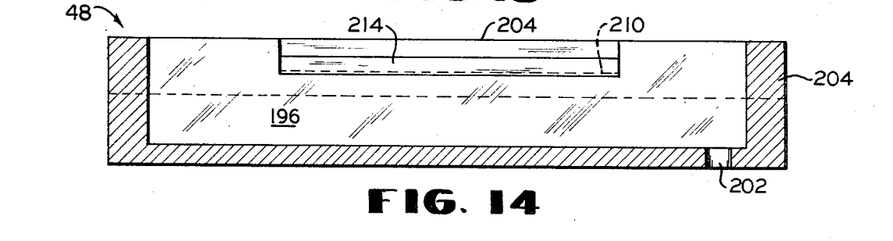
FIG. 14 is a sectional view of the mold in FIG. 13 taken along line 14—14.
Figure 15:
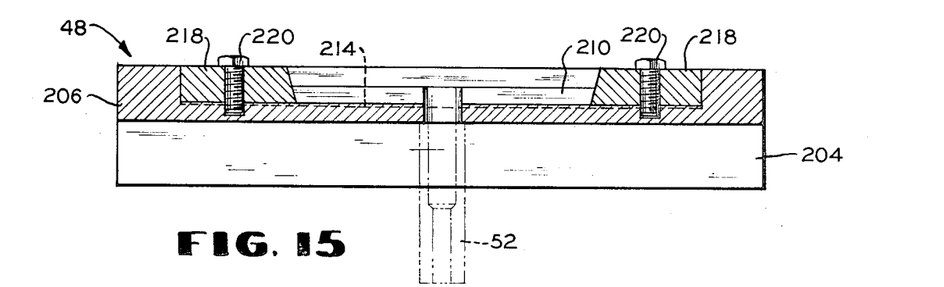
FIG. 15 is a sectional view of the mold in FIG. 13 taken along line 15—15.

Positioning of the battery plates 92 by the clamping fixture 90 also facilitates the mating of the lugs of the battery plates 92 to the mold 48 to assure proper alignment during the cast-on operation thereby obtaining proper positioning of the cast-on straps on the lugs of the battery plates 92. A typical mold 48 is illustrated in FIGS. 9, 10, 11 and 12 with fragments of the mold supporting angles 54 shown attached to the mold. In the plan view, FIG. 9, a canal 196 connects a supply well 198 with a return well 200 to which molten metal such as lead is supplied at the supply well 198, transverses the canal 196 and is returned through the return well which has a drain hole 202. The wells 198 and 200 and canal 196 are encompassed on all sides and the bottom by the mold body 204 which is typically made of steel and can be a casting, fabrication, machined piece of steel or the like. The top of the body 204 is open with flanges 206 and 208 extending at generally right angles from each of the two sides with the outer periphery of the flanges 206 and 208 being even with the top of the mold body 204. Three strap cavities 210 each of sufficient length to cover two cell groupings of battery plates 92, are arranged longitudinally across the face of one flange 208 while the other flange 206 contains four strap cavities 210 similarly arranged, the middle two of which are for covering two cell groupings and the end two of which are for covering a single cell grouping. Each strap cavity 210 has a hole in the center of the cavity 210 which hole passes through the bottom of each cavity 210 to provide access for knockout pins 46. The configuration of the strap cavities 210 is illustrated in FIGS. 10 and 11 being of a rectangular shape. Other shapes are acceptable to the concept presented as long as the strap cavities 210 are sufficient to encompass the lugs of the battery plates 92 constituting the proper cell grouping. Where two cell groupings are covered by one strap cavity 210, typically a divider strip 212 is added to the hole to give separation between the cells. It should be noted that the strap cavities 210 are adjacent the canal 196, as illustrated in FIG. 12, and have sloping sides. These sloping sides in conjunction with the sloping interconnecting planes 214 serve functionally in the machine operative cycle to guide and direct the flow of molten metal in the mold 48. The recess of the canal 196 below the depth of the strap cavities 210 will be seen to be of greater significance when the operation of the machine is described below. As an alternative to the external cooling tubes 60 and 62 illustrated in FIG. 1, water passages 216 can be incorporated within the body of the mold 48.

FIG. 11 illustrates two adaptors 52 for knockout pins. The adaptor 52 on the end of flange 206 is typical of one for use in forming a battery terminal, and a like type adaptor is furnished for the cavity 210 on the opposite end of flange 206. The remaining cavities in flange 206 and all the cavities of flange 208 receive adaptors 52 such as the one adjacent the adaptor 52 for forming the terminal. These adaptors 52 typically are fabricated to form posts of rectangualr cross-section which are subsequently used to join cells. FIG. 9 illustrates the two types of adaptors in plan view wherein the hole 215 for receiving the knockout pin is illustrated as well as filler portions 217, such as brazing, used in conjunction with divider strip 212 to define the boundaries of the cell posts.

The machine is not limited to the embodiment of mold 48 of FIGS. 9 through 12, but rather is functional with any mold 48 of a similar nature such as illustrated in FIGS. 13 through 16. These figures illustrate a mold 48 with identical flanges 206 and 208 which may, typically, contain only two strap cavities 210, one in each flange 206 and 208, or several cavities in each flange. A hole is provided in the bottom of each cavity for knockout pin access. The supply and return wells have been blended into the canal 196 extending it beyond the strap cavities 210. The right side of the mold body 204 contains the drain hole 202 to facilitate return of the molten metal. Again, the canal is recessed below the strap cavities 210 which are located in flanges 206 and 208 mounted at generally right angles to the mold body 204. The flanges 206 and 208 are connected to the mold body with interconnecting planes 214 having slopes toward the canal 196, and the strap cavities 210 also have the sloped sides to guide and direct flow of the molten metal. Knockout pin adaptors 52 are shown in phantom. The design permits ready adjustment of the length of the strap cavities 210. This adjustment allows one mold 48 to be used for various sized single or multiple cell industrial batteries having a varying number of battery plates 92 or cells. Strap cavity lengths are adjusted in correlation to the distance between the extreme or end battery plates as well as the number of cells. The well plugs 218, illustrated in FIG. 13, terminate the ends of the cavity straps by having a cross-section conforming to that of the strap cavities 210 and by virtue of being fastened to mold 48 by bolt 220. Clearly, any size and number of plugs can be used to obtain the strap length and configuration of cell combinations desired.

Viewing both of the above molds 48, it is anticipated that in both instances the molds 48 could have been constructed with flanges 206 and 208 which were removable from the body 204 of the mold. If desirable, one body 204 could be used in conjunction with a number of varying flanges 206 and 208.

The machine is a combination of the above structures and mechanisms which, in combining, result in an operation which produces cast-on straps permanently affixed to the lugs of battery plates 92 which battery plates 92 are properly positioned and grouped to correlate with the cells of a battery case. The general operation of the machine can best be understood by viewing FIGS. 1 and 3 in conjunction with the following cycle of the machine.

With the carriage 70 in position B (see FIG. 3) the attendant loads battery plates 92, having insulating spacers between them, with the lugs down into the clamping fixture 90 which is in the open position. The lugs of the battery plates 92 have previously been fluxed. When the clamping fixture is firmly mounted on the carriage 70, the battery plates 92 will now move with the carriage 70. The attendant presses a start button which initiates the mold fill valve, the valve's timer and a time delay on the operator 142 which swings the burner assembly 126 down over the mold 48 from the inoperative position illustrated in FIG. 3. As the mold begins to fill with molten metal as a result of initiating the fill valve, the time delay on the burner assembly operator 142 times out and the burner assembly comes down and the flame comes on, sweeping the upper face of the mold 48 and the molten metal therein. The mold timer times out after the level of the molten metal in the mold has overflowed into the strap cavities 210 (see FIGS. 9 and 13). This opens the fill valve allowing the level of the molten metal to recede into the canal 196 with molten metal being retained only in the strap cavities 210. When a temperature sensor such as a thermocouple (not illustrated) indicates a proper temperature, in the range of 590° to 604° F., the burner assembly 126 is turned off and returned to its inoperative position. The attendant pushes carriage 70 to position A. The carriage trips limit switches (not illustrated) satrting the lowering of the elevator. When the elevator reaches the bottom of its travel, limit switches stop its travel and initiate a water valve (not illustrated) sending cooling water through cooling tube 62. The cooling tube 61 on the mold adaptors is furnished with a constant supply of water. A water timer (not illustrated) is also initiated by the limit switches. At this point in the cycle, the lugs of the battery plateesvel 92 are within the molten metal in the strap cavities 210 of the mold 48. The cooling water in cooling tube 62 enhances the cooling of the mold 48 and hence the solidification of the molten metal in the strap cavities 210. The molten metal solidifies about the lugs of the battery plates 92 forming connecting straps of the shape of the strap cavities 210 which are affixed to the lugs of the battery plates, by the time the water timer times out. Timing out of the timer initiates an air blast through the cooling tube 62 clearing the water from the tube 62, and also initiates the upward motion of the elevator and knockout tables. This upward motion causes the knockout pins to push the strap castings up out of the mold 48 as the elevator lifts the lugs on the battery plates 92 to which the strap castings are attached. When the elevator reaches its uppermost position, a limit switch (not illustrated) stops the drive motor 31 and resets the timer for the next cycle. The attendant now draws the carriage 70 from position A to position B and turns the crank wheel 88 to invert the carriage placing it in position C. The clamping fixture 90 is now opened by releasing the handle 178 and the battery plates, joined as cells, and accompanying insulators are dropped with the lugs of the battery plates 92 up into an awaiting battery case 158. The carriage 70 can now be returned to position B by reversing the rotation of the crank wheel 88 and the machine is ready to be recycled.

The above typical cycle is semi-automatic making use of limit switches. The machine is not limited to this type cycle, but rather could be operated completely manually or could even be more automated. Similarly, the machine is operable and functional for the cast-on process without the carriage 70 being movable or invertable by use of the rotatable track 72 and crank wheel 88. Other means such as level sensors for sensing the level of the molten metal in the mold 48 are also available as alternatives to timers.

Figure 19:
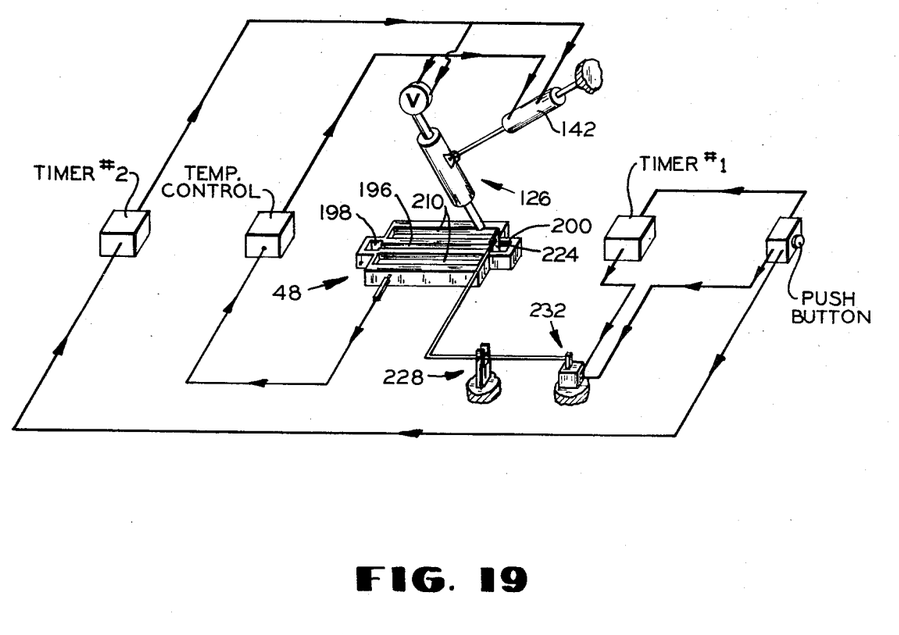
FIG. 19 is a control schematic for the machine.

FIG. 19 illustrates a simplified control schematic containing a simplified view of a mold 48 and the primary control elements. When the attendant pushes the push button, a signal is sent to the solenoid 232 which activates the linkage attached to fulcrum 228 to drop the gate valve 224. The signal is also sent to the timers #1 an #2 to activate their timing cycles. The mold canal 196 begins to fill with molten metal when the gate valve 224 drops. After a slight delay timer #2 times out, sending a signal to both the fuel valve and cylinder operator 142 of the burner assembly 126, bringing the assembly 126 down to the position illustrated, that is, over the mold 48 and rising molten metal. Subsequently, timer #1 times out after an interval sufficient to allow the molten metal to overflow the mold cavities 210. Timer #1, at this point, sends a signal to the solenoid 232 to raise the gate valve 224 allowing the level of molten metal to fall. This leaves residual molten metal only within the cavities 210 with the flame sweeping over them. Finally, when the thermocouple attached to the mold 48 senses mold and molten metal have reached the proper temperature, a signal is sent to the temperature control which in turn sends a signal to the fuel valve to close and the cylinder operator to retract, thereby turning off the burner assembly 126 and retracting it from the region to be occupied by carriage 70 and the clamped assembly of battery plates 92.

Two features of the machine which merit special attention are the overflow filling of the strap cavities 210, and the use of the flame on the surface of the mold end molten metal.

Figure 16:
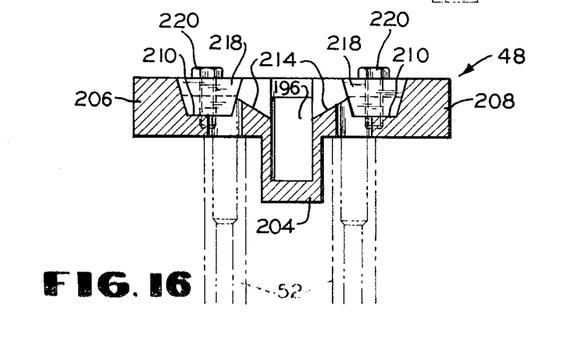
FIG. 16 is a sectional view of the mold in FIG. 13 taken along line 16—16.
Figure 17:
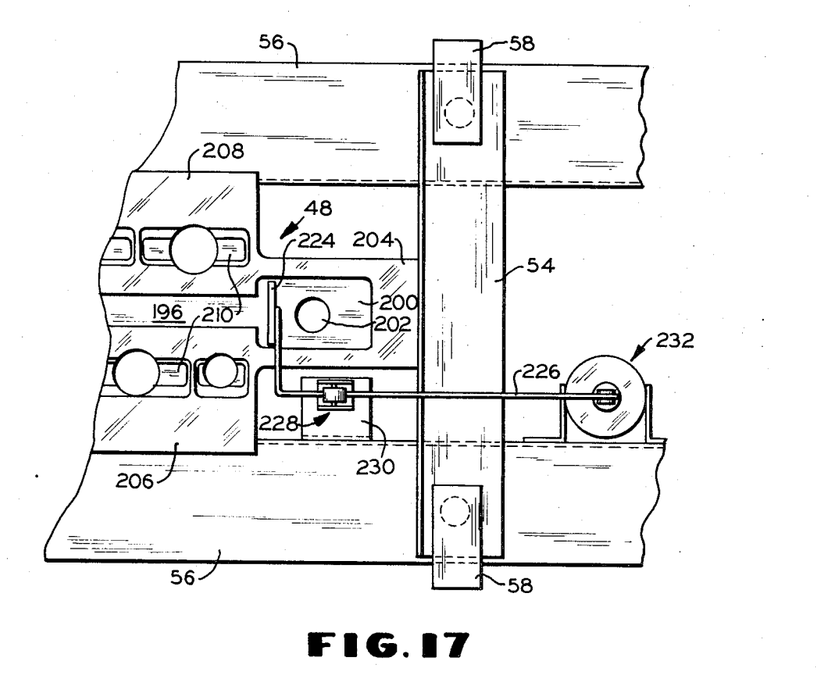
FIG. 17 is a fragmentary plan view of a mold and filling valve including the immediate supporting structure.
Figure 18:
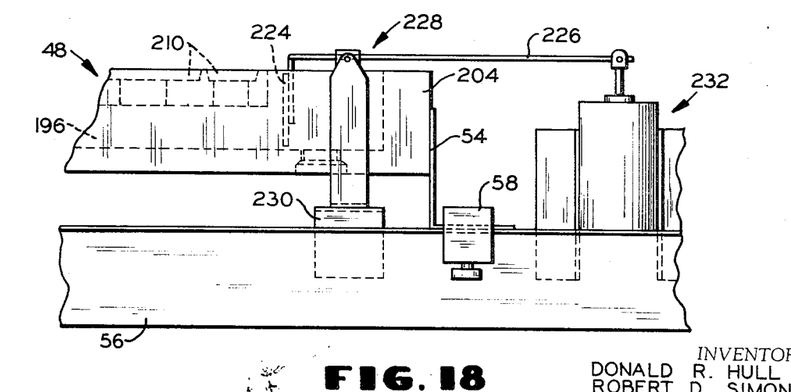
FIG. 18 is a fragmentary elevational view of the structure in FIG. 17.

The overflow filling is a simplified method of accurately filling the strap cavities 210 to the proper level without having to measure the exact amount of lead required for each cavity 210 and then metering this amount into each cavity 210. The structure of the mold 48 in conjunction with the dam type gate valve 224, illustrated in FIG. 17, make the overflow method functional. Both FIGS. 12 and 16 illustrate the lower position of the canal 196 with respect to the strap wells 210. This relationship allows a continuous flow of molten metal from a source typically independent of the machine, such as the heated reservoir 33, pump 37 and conduits 39 and 41 illustrated in FIG. 1 wherein the pump maintains a continuous flow of the molten metal in supply conduit 39 and to the canal 196 even while the straps are solidifying thereby maintaining the temperature of the bottom of the mold 48 and avoiding buildup of solidified metal. The slope of the sides of the strap cavities 210 and the slope of the interconnecting planes between the cavities 210 and the canal 196 direct and guide the overflow into the cavities 210 and then subsequently directs and guides the excess of molten metal back into the canal as the level recedes back into the canal 196 after the cavities 210 are filled. Only when the gate valve, in FIG. 17, is dropped to fill the mold, is the return flow interrupted. At this point, generally, there is sufficient heat storage in the molten metal buildup in the mold 48 to maintain the liquid state. FIGS. 17 and 18 illustrate a typical mechanism, capable of functioning as a filling valve consisting of the gate valve 224 for damming the flow of molten metal, an operative arm 226, fulcrum 228, fulcrum support 230, and a solenoid 232. Upon a signal, the solenoid 232 retracts pulling the arm 226 downward at the end pivotally connected to the solenoid 232 causing the arm to pivot on the fulcrum 228 thereby raising the end of the arm connected to the gate valve from the down or closed position illustrated. Clearly, many other actuators such as cylinders, drive motors, springs etc. as well as numerous linkages are available to achieve the same result, and the machine therefore should not be limited to the typical embodiment illustrated.

The burner assembly 126 can be seen to give further assurance against the gate valve 224 freezing and the solidification of residual metal when the mold 48 is filled, since its flame is placed over the mold at this point in the cycle. The sweeping of the flame across the mold 48 filled with molten metal assures proper temperature of the lead retained in the mold cavities and a deoxidized surface on the molten metal prior to contact with the lugs of the battery plates 92. This assures a good bond between casting and lugs. Clearly, the placement of the flame on the mold 48 prior to filling of the mold brings the surface of the mold 48 up to temperature prior to flowing of the metal thereby assuring free flow of the metal into the mold cavities 210.

The machine is one which has a simple operation for obtaining a strap connection between battery plates 92 and in addition groups the plates in a manner corresponding to the cells of the battery case 158 into which the battery plates are ultimately to be placed.

The flaming operation assures a good bond between cast strap and the lugs of the battery plates 92 as well as assuring a good casting by virtue of free flow of the molten metal.

The operation of the machine is simple enough that no special skill is required of the operator in its setup or running.

The simple method of accurately filling the strap cavities 210 to the desired level without measuring, makes the machine more economical from the standpoint of both less equipment on the machine, and less maintenance in operation.

Loading and unloading is greatly enhanced by the transferrable and invertable carriage 70 and clamping fixture 90.

In accordance with the provisions of the patent statutes, the principle and mode of operation of the machine have been explained and what is considered to represent its best embodiment has been illustrated and described. It should, however, be understood that the invention may be practiced otherwise than as specifically illustrated and described without departing from its spirit or scope.

We claim:

1. A machine for casting on elements to lugs of battery plates comprising a base; a mold with a cavity secured to said base; said mold having a receptacle; said mold having a flow passage for molten material extending between said receptacle and said cavity, said passage having a minimum elevation of fluid communication between said receptacle and said cavity defining the desired maximum elevation of molten material to be retained in said cavity; said receptacle having margins above said minimum elevation; said cavity extending below said minimum elevation; means to fill said receptacle with molten material to a level above said minimum elevation whereby the rise of the surface of molten material within said receptacle causes the overflow of the molten material into said cavity; means to withdraw molten material from said receptacle to a level below said minimum elevation whereby receding of the surface of molten metal back into said receptacle leaves a measured amount of molten material within said cavity; means fixed in position with respect to said base for positioning the lugs of battery plates within said cavity; and means secured to said base for extracting solidified material from said cavity.

2. The machine of claim 1 wherein said means supplying molten material includes means for maintaining a continuous flow of molten material into said receptacle in a feeding region, and means for withdrawing molten material flowing from said feeding region from said receptacle in an exhaust region.

3. The machine according to claim 2 including means for selectively impeding withdrawal of molten material from said exhaust region.

4. The machine in claim 2 wherein said receptacle comprises a canal for conveying molten material from said feeding region spaced from an exhaust region, said canal being adjacent said cavity.

5. The machine accordnig to claim 4 wherein said cavity is located along a margin of said receptacle intermediate said feeding region and said exhaust region.

6. The machine according to claim 3 wherein said impeding means comprises a dam type gate to isolate said exhaust region, a solenoid operator and a linkage between said gate and said solenoid.

7. The machine according to claim 3 including control means for actuating said impeding means for an interval sufficient to permit said molten material to rise in said receptacle and overflow into said cavity, timing means defining said interval, and means to shift said impeding means into and out of its withdrawal impeding position in response to said control means.

8. The machine according to claim 1 including a second cavity in said mold spaced from said first cavity and adjacent said receptacle margin for overflow filling with such filling of the first cavity.

9. The machine in claim 1 including means for heating said mold and the molten material therein.

10. The machine in claim 9 wherein said means for heating comprises a burner for directing a flame for sweeping the face of said mold and the molten material, and flame control means for imparting deoxidizing characteristics to said flame.

11. The machine according to claim 10 including temperature sensing means for sensing the temperature of the mold in the vicinity of the cavity and burner control means responsive to a predetermined temperature for terminating the sweeping of the face of said mold by said flame.

12. The machine according to claim 10 including a burner mount fixed with respect to said base and supporting said burner for movement between a first position closely adjacent the upper surface of siad mold and a second position remote from said surface, and means to move said mount and burner between said first and second positions.

13. The machine according to claim 11 wherein said means supplying molten material includes means for continuously introducing molten material into said receptacle in a feeding region, and means for withdrawing molten material from said receptacle in an exhaust region, and including means for selectively impeding withdrawal of molten material from said exhaust region, control means for actuating said impeding means for an interval sufficient to permit said molten material to rise in said receptacle and overflow into said cavity, timing means defining said interval, means to shift said impeding means into and out of its withdrawal impeding position in response to said control means, a second timer defining an interval shorter than said first timer instituted by said control means, a burner for directing a flame over the face of said mold and the molten material in response to the expiration of said second timer interval, temperature sensing means for sensing the temperature of the mold in the vicinity of the cavity, and burner control means responsive to a predetermined temperature for terminating the sweeping of the face of said mold by said flame.

14. The machine in claim 1 wherein said means for positioning lugs of battery plates comprises an elevator having vertical movement.

15. The machine in claim 1 including a conduit for cooling fluid attached to said mold.

16. The machine in claim 1 including a conduit for cooling fluid in proximity and intimate heat trannsfer relationship to the mold portions defining walls of the cavity.

17. The machine in claim 1 wherein said cavity is an elongate trough and including means for establishing a longitudinal end for said cavity at selected positions over a range of positions along the longitudinal dimension of said cavity.

18. The machine in claim 1 in combination with a clamping fixture, said fixture attached to said means for positioning and capable of positioning battery plates by gripping groups of plates in a spaced arrangement correlating to the spacing of said cavities in said mold.

19. The combination according to claim 18 wherein said fixture comprises stationary and moveable clamp elements mounted in paired face to face relationship to a number of parallel and aligned spaced pairs corresponding to the number of battery plate groups required for a number of cells of a battery, said moveable elements each having a first position closely adjacent and generally parallel to its paired stationary element and a second position more remote and generally parallel to its paired stationary element, and means for moving said moveable elements to their second position whereby the space between said moveable elements and the stationary element of the next adjacent pair in the direction of movement is reduced to grip a group of battery plates placed therebetween.

20. The combination according to claim 19 including travel rods to mount said moveable elements and provide the moveable support for said moveable elements, end plates for supporting and guiding said rods, and toggles interconnecting said rods and said fixture to move said rods and said moveable elements.

21. The combination according to claim 20 includnig a mount connecting each rod and each respective moveable element, a collar on each rod for each respective moveable element, and a spring intermediate said mount and said collar to spring load each moveable element independently of the other elements.

22. The combination according to claim 18 wherein said fixtures comprises stationary and moveable clamp bars, stacks of said bars being arranged with longitudinal edges butted against each other in a common plane, said moveable bars intermittently spaced between each of said stationary bars, said fixture having a number of said stacks spaced in correspondence to the number of battery plate groups required for the number of cells of a battery plus one initial stack of said stationary bars, and means for moving said bars normal to the common plane of said stacks thereby diminishing the open space between said stationary bars and said moveable bars which advance toward said stationary bars to grip groups of battery plates placed therebetween.

23. The machine in claim 1 in combination with a horizontally transversing carriage, said carriage adapted to ride within said means for positioning and a battery plate clamping fixture mounted on said carriage.

24. The combination according to claim 1 wherein said positioning means includes a pair of horizontal rails, means for raising and lowering an elevator section of said rails, means for rotating about a horizontal axis an inverting section of said rails spaced from said elevator section, a carriage adapted to ride on said pair of rails, and a battery plate clamping fixture mounted on said carriage.

25. The machine in claim 1 including a knockout pin for said cavity and means for moving said pin relative to said mold and cavity for releasing solidified material from said cavity.

26. The combination according to claim 24 including a knockout pin for said cavity and means for moving said pin relative to said mold and cavity for releasnig solidified material from said cavity, said moving means being operatively coupled to said means for raising and lowering said rails to move to releasing position as said rails are raised.

References Cited
UNITED STATES PATENTS

| | | | |
|---|---|---|---|
| 1,897,066 | 2/1933 | Mayer | 164—109 X |
| 3,072,984 | 1/1963 | Bronstert | 164—109 |
| 3,080,627 | 3/1963 | Hoteko | 164—155 |
| 3,395,748 | 8/1968 | Tiegel | 164—108 X |
| 3,504,731 | 4/1970 | Farmer | 164—334 X |

R. SPENCER ANNEAR, Primary Examiner

U.S. Cl. X.R.

164—157, 333, 334